US012598583B2

(12) United States Patent
Jiang et al.

(10) Patent No.: US 12,598,583 B2
(45) Date of Patent: Apr. 7, 2026

(54) PAGING METHODS AND APPARATUSES, AND STORAGE MEDIA

(71) Applicant: BEIJING XIAOMI MOBILE SOFTWARE CO., LTD., Beijing (CN)

(72) Inventors: Xiaowei Jiang, Beijing (CN); Wei Hong, Beijing (CN); Dong Chen, Beijing (CN); Lei Yu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 322 days.

(21) Appl. No.: 18/278,620

(22) PCT Filed: Feb. 24, 2021

(86) PCT No.: PCT/CN2021/077746
§ 371 (c)(1),
(2) Date: Aug. 23, 2023

(87) PCT Pub. No.: WO2022/178733
PCT Pub. Date: Sep. 1, 2022

(65) Prior Publication Data
US 2024/0147419 A1      May 2, 2024

(51) Int. Cl.
*H04W 68/02*          (2009.01)
*H04W 52/02*          (2009.01)

(52) U.S. Cl.
CPC ....... *H04W 68/02* (2013.01); *H04W 52/0209* (2013.01)

(58) Field of Classification Search
CPC .............. H04W 68/02; H04W 52/0209; H04W 52/0229; H04W 76/14; H04W 52/02; H04W 88/04

USPC ......................................................... 455/458
See application file for complete search history.

(56) References Cited

U.S. PATENT DOCUMENTS

| | | | |
|---|---|---|---|
| 10,251,124 B2 * | 4/2019 | Siann ..................... | H04W 68/02 |
| 2009/0221303 A1 | 9/2009 | Soliman | |
| 2012/0069827 A1 * | 3/2012 | Lee ................... | H04W 52/0274 370/338 |
| 2016/0128128 A1 | 5/2016 | Lok et al. | |
| 2018/0077624 A1 | 3/2018 | Jung et al. | |

(Continued)

FOREIGN PATENT DOCUMENTS

| | | |
|---|---|---|
| CN | 1323495 A | 11/2001 |
| CN | 101765206 A | 6/2010 |

(Continued)

OTHER PUBLICATIONS

State Intellectual Property Office of the People's Republic of China, Office Action and Search Report Issued in Application No. 202180000554X, Oct. 11, 2023 with English Translation), (23p).

(Continued)

*Primary Examiner* — Hirdepal Singh
(74) *Attorney, Agent, or Firm* — Arch & Lake LLP

(57) ABSTRACT

Provided in the present disclosure are a paging method and apparatus, and a storage medium. The paging method includes: determining that entry into a target sleep state is required, and transmitting an assisted paging request to at least one second terminal device; and determining that a target terminal device of the at least one second terminal device accepts the assisted paging request, and entering the target sleep state.

18 Claims, 9 Drawing Sheets

(56) References Cited

U.S. PATENT DOCUMENTS

| | | | | |
|---|---|---|---|---|
| 2018/0368101 | A1 | 12/2018 | Agiwal et al. | |
| 2020/0329455 | A1* | 10/2020 | Ryu | H04W 76/28 |
| 2020/0359196 | A1 | 11/2020 | Balasubramaniam et al. | |
| 2022/0039061 | A1* | 2/2022 | Murray | H04W 24/08 |
| 2022/0346016 | A1* | 10/2022 | Fan | H04W 52/0232 |
| 2023/0156660 | A1* | 5/2023 | Natarajan | H04W 76/28 |
| | | | | 370/329 |
| 2023/0370967 | A1* | 11/2023 | He | H04W 68/005 |

FOREIGN PATENT DOCUMENTS

| | | | |
|---|---|---|---|
| CN | 101960897 A | 1/2011 | |
| CN | 101960911 A | 1/2011 | |
| CN | 103125135 A | 5/2013 | |
| CN | 111372303 A | 7/2020 | |
| CN | 111385856 A | 7/2020 | |
| CN | 111726862 A | 9/2020 | |
| CN | 111918330 A | 11/2020 | |
| CN | 113498626 A | 10/2021 | |
| KR | 20100113427 A | 10/2010 | |

OTHER PUBLICATIONS

ISA State Intellectual Property Office of the People's Republic of China, Written Opinion of the International Searching Authority Issued in Application No. PCT/CN2021/077746, Nov. 23, 2021, with English Translation, WIPO, (9p).

The State Intellectual Property Office of People's Republic of China, "Second Office Action" issued in Application No. 202180000554.X dated Apr. 25, 2024, with English Translation (21p).

Intel Corporation, "Further considerations on paging", 3GPP TSG RAN WG2#97, R2-1701727, Athens, Greece, Feb. 13-17, 2017, (3p).

LG Electronics Inc., "Discussion on paging assistance information in RRC-INACTIVE state", 3GPP TSG-RAN WG3 Meeting #97bis, R3-173871,Prague, Czech Republic, Oct. 9-13, 2017, (10p).

Li Gui-yong et al., "Research and Implementation of Idle State of eDRX in eMTC Terminal", doi, 10. 13756/j. gtxyj.2018. 02. 020, Study On Optical Communications, 2018.04 (Sum. No. 206), p. 71-74, (4p).

International Search Report of Application No. 202180000554.X issued by ISA/CN dated Jul. 11, 2024 (4p).

ISA State Intellectual Property Office of the People's Republic of China, International Search Report Issued in Application No. PCT/CN2021/077746, Nov. 23, 2021, WIPO, 4 pages.

"System architecture for the 5G System (5GS)", 3GPP TS 23.501 V18.2.2 (Jul. 2023), 385 pages.

"Procedures for the 5G System (5GS)", 3GPP TS 23.502 V18.2.0 (Jun. 2023), 188 pages.

* cited by examiner

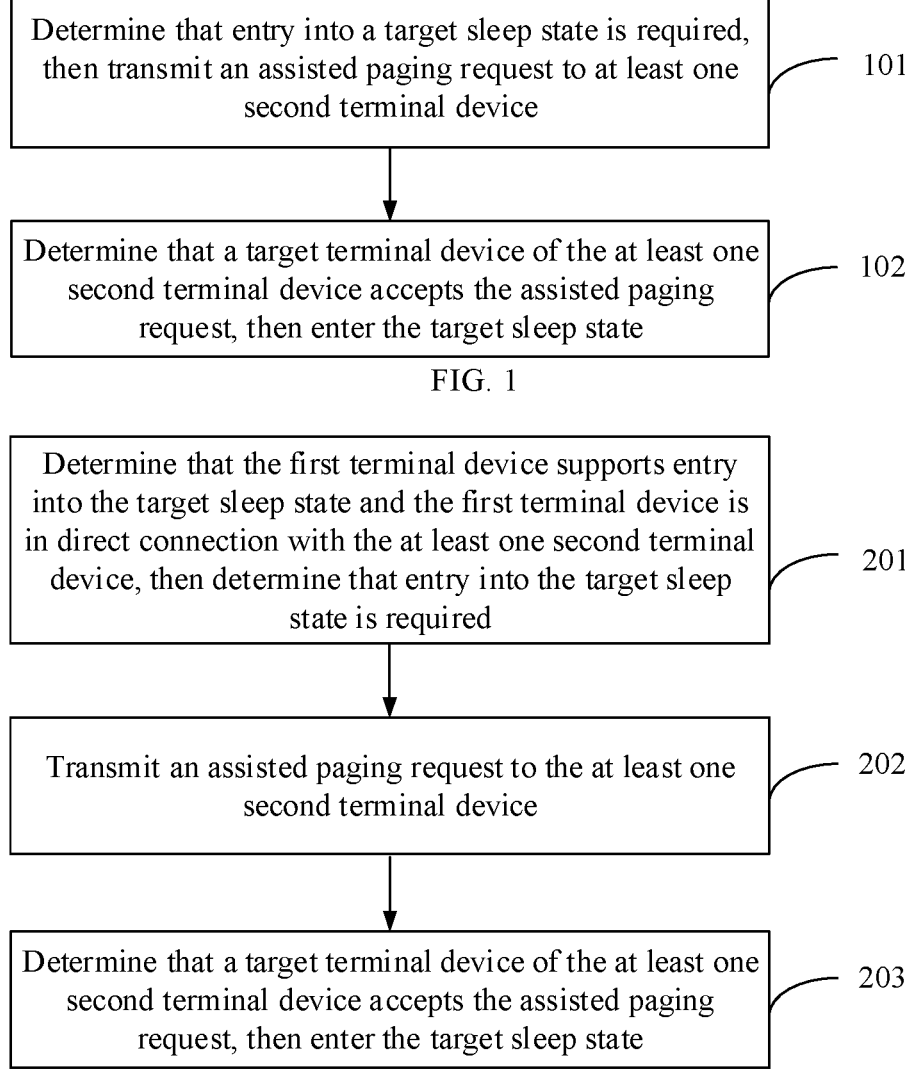

Determine that entry into a target sleep state is required, then transmit an assisted paging request to at least one second terminal device — 101

Determine that a target terminal device of the at least one second terminal device accepts the assisted paging request, then enter the target sleep state — 102

FIG. 1

Determine that the first terminal device supports entry into the target sleep state and the first terminal device is in direct connection with the at least one second terminal device, then determine that entry into the target sleep state is required — 201

Transmit an assisted paging request to the at least one second terminal device — 202

Determine that a target terminal device of the at least one second terminal device accepts the assisted paging request, then enter the target sleep state — 203

FIG. 2

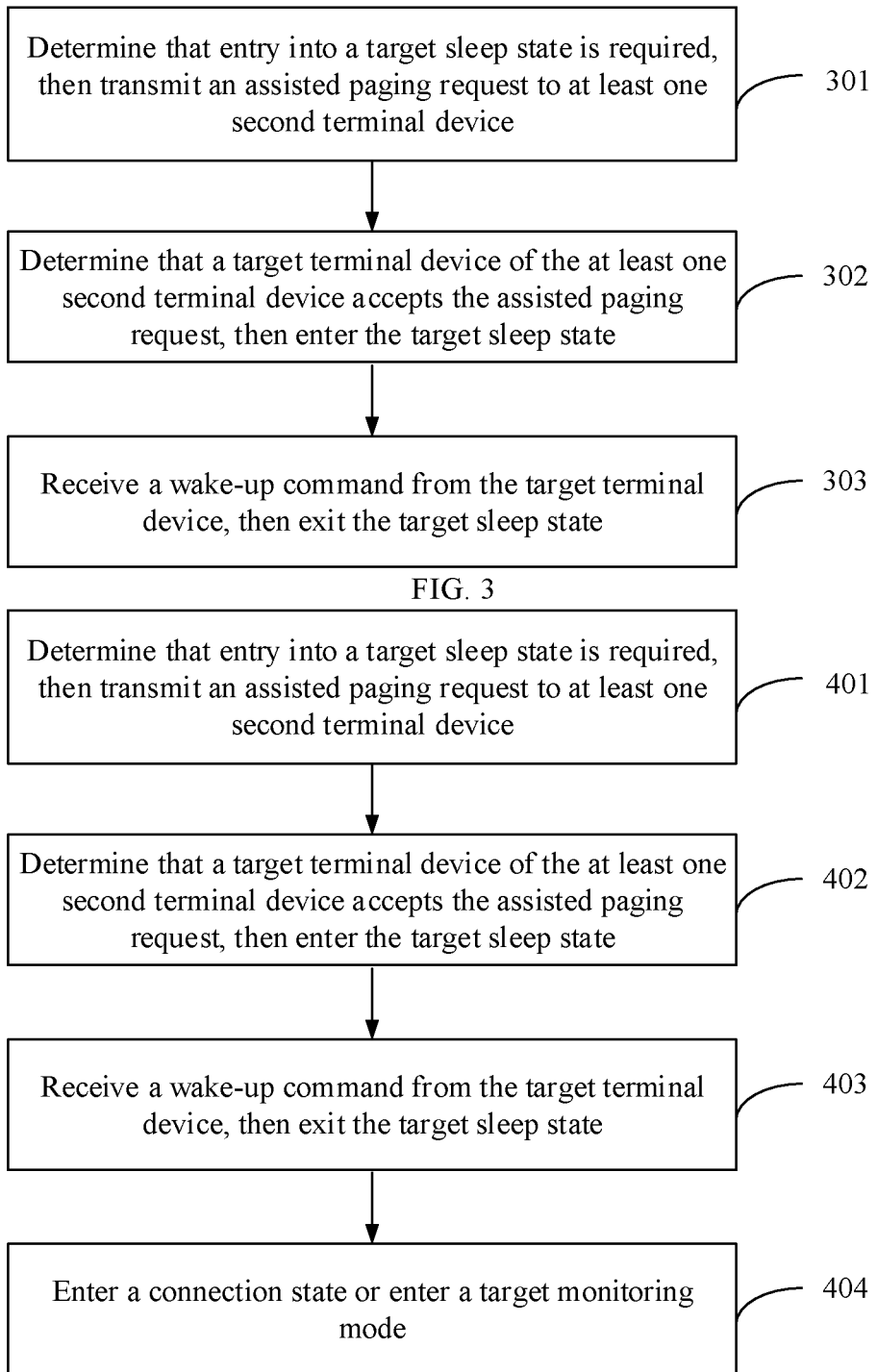

Determine that entry into a target sleep state is required, then transmit an assisted paging request to at least one second terminal device — 301

Determine that a target terminal device of the at least one second terminal device accepts the assisted paging request, then enter the target sleep state — 302

Receive a wake-up command from the target terminal device, then exit the target sleep state — 303

FIG. 3

Determine that entry into a target sleep state is required, then transmit an assisted paging request to at least one second terminal device — 401

Determine that a target terminal device of the at least one second terminal device accepts the assisted paging request, then enter the target sleep state — 402

Receive a wake-up command from the target terminal device, then exit the target sleep state — 403

Enter a connection state or enter a target monitoring mode — 404

FIG. 4

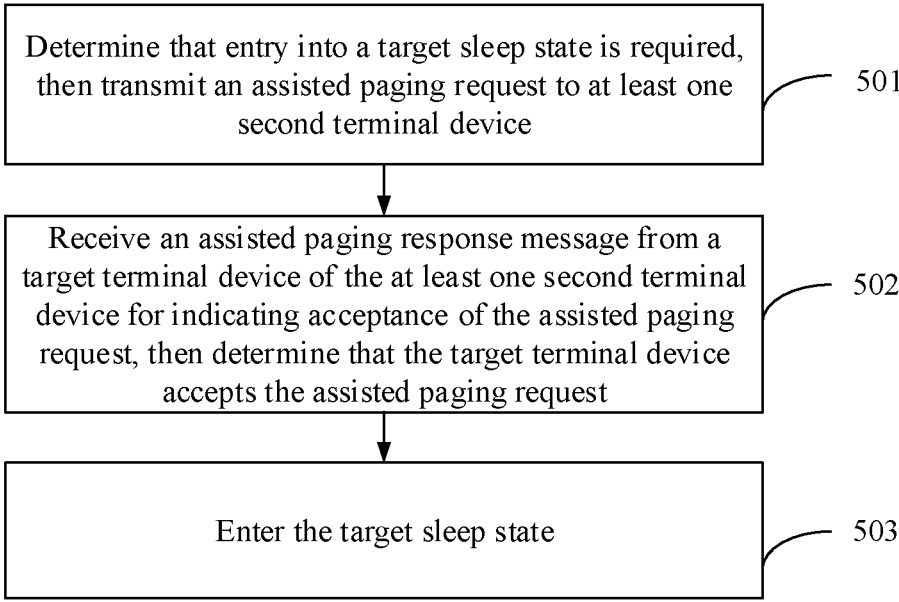

Determine that entry into a target sleep state is required, then transmit an assisted paging request to at least one second terminal device — 501

Receive an assisted paging response message from a target terminal device of the at least one second terminal device for indicating acceptance of the assisted paging request, then determine that the target terminal device accepts the assisted paging request — 502

Enter the target sleep state — 503

FIG. 5

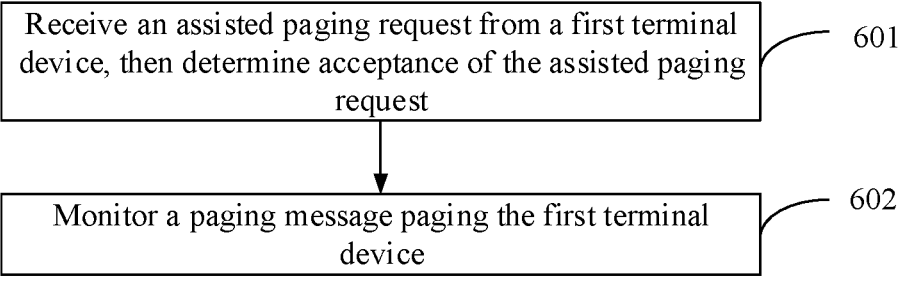

Receive an assisted paging request from a first terminal device, then determine acceptance of the assisted paging request — 601

Monitor a paging message paging the first terminal device — 602

FIG. 6

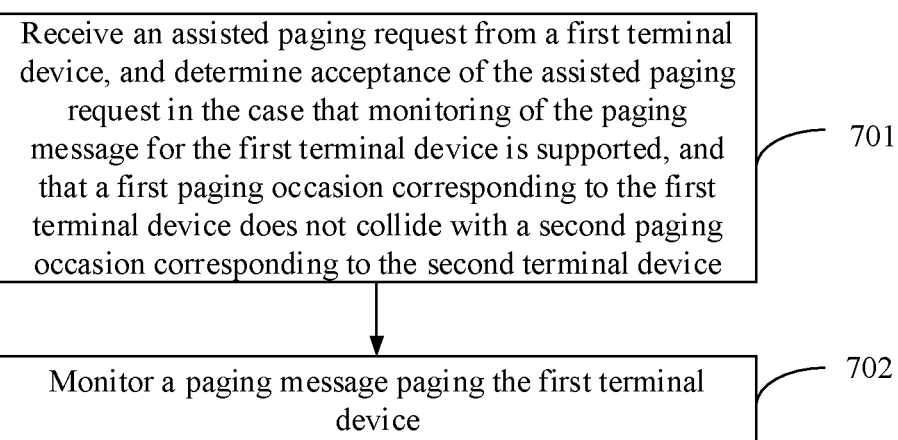

Receive an assisted paging request from a first terminal device, and determine acceptance of the assisted paging request in the case that monitoring of the paging message for the first terminal device is supported, and that a first paging occasion corresponding to the first terminal device does not collide with a second paging occasion corresponding to the second terminal device — 701

Monitor a paging message paging the first terminal device — 702

FIG. 7

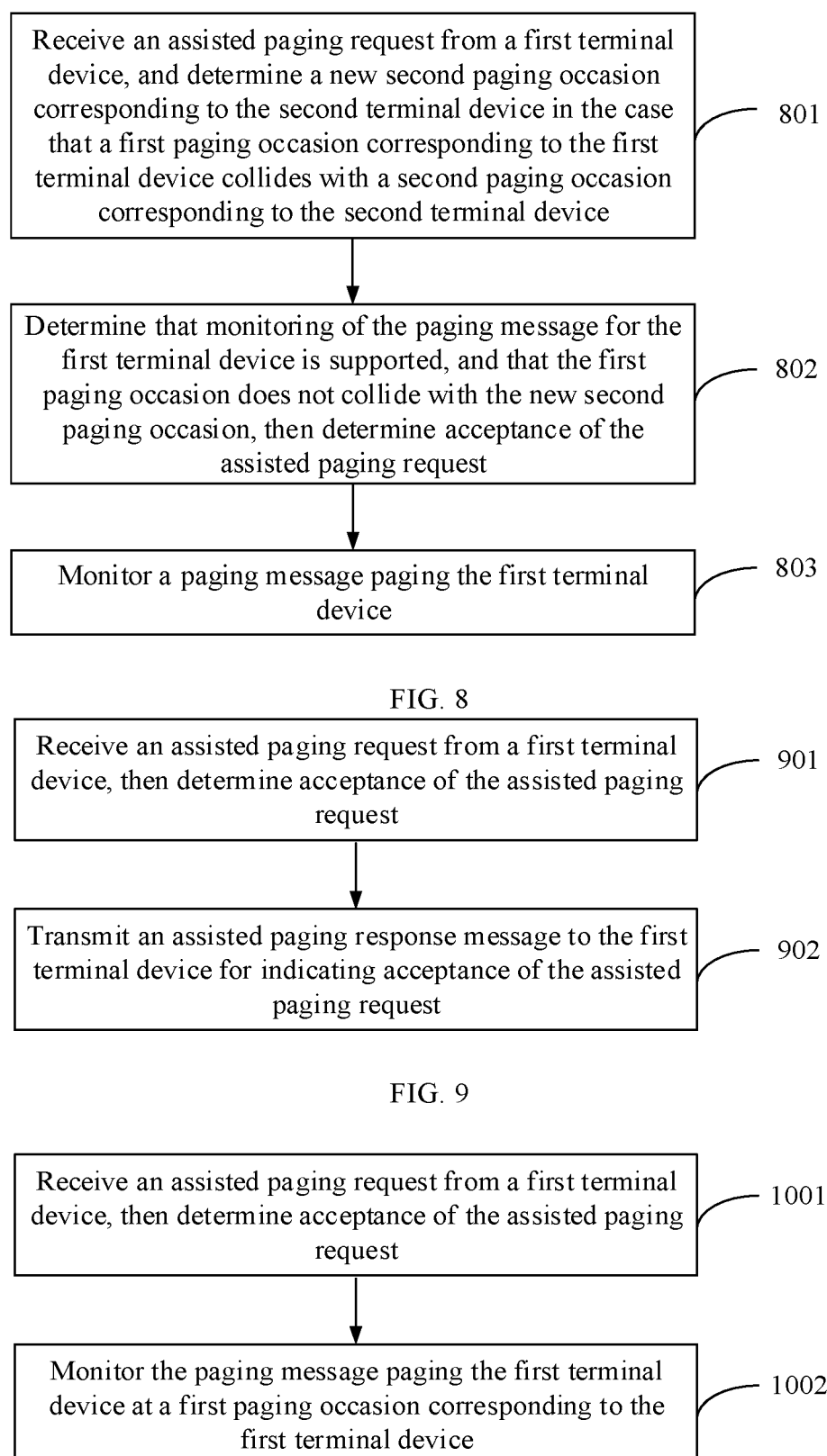

Receive an assisted paging request from a first terminal device, and determine a new second paging occasion corresponding to the second terminal device in the case that a first paging occasion corresponding to the first terminal device collides with a second paging occasion corresponding to the second terminal device — 801

Determine that monitoring of the paging message for the first terminal device is supported, and that the first paging occasion does not collide with the new second paging occasion, then determine acceptance of the assisted paging request — 802

Monitor a paging message paging the first terminal device — 803

FIG. 8

Receive an assisted paging request from a first terminal device, then determine acceptance of the assisted paging request — 901

Transmit an assisted paging response message to the first terminal device for indicating acceptance of the assisted paging request — 902

FIG. 9

Receive an assisted paging request from a first terminal device, then determine acceptance of the assisted paging request — 1001

Monitor the paging message paging the first terminal device at a first paging occasion corresponding to the first terminal device — 1002

FIG. 10

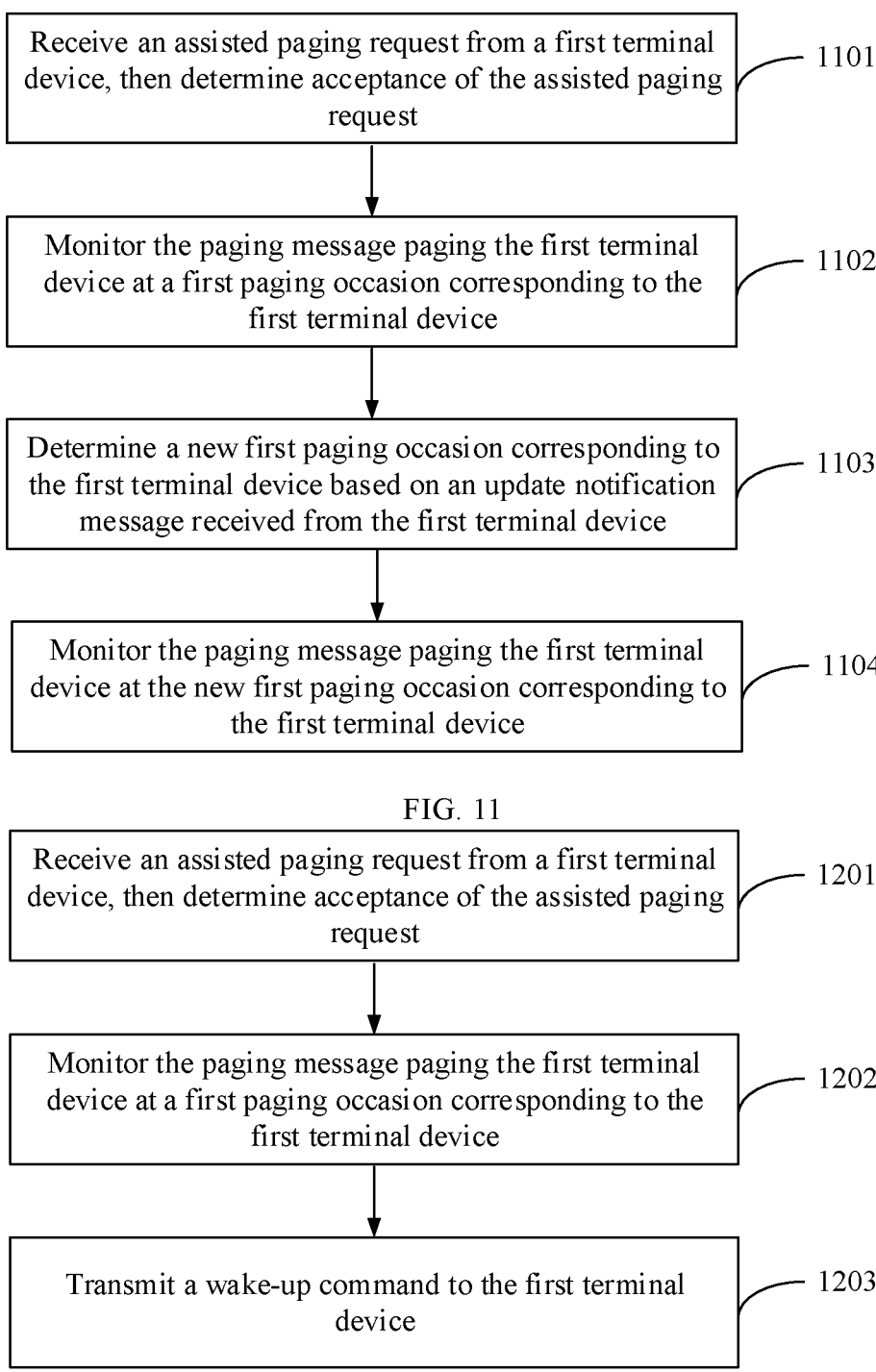

Receive an assisted paging request from a first terminal device, then determine acceptance of the assisted paging request — 1101

Monitor the paging message paging the first terminal device at a first paging occasion corresponding to the first terminal device — 1102

Determine a new first paging occasion corresponding to the first terminal device based on an update notification message received from the first terminal device — 1103

Monitor the paging message paging the first terminal device at the new first paging occasion corresponding to the first terminal device — 1104

FIG. 11

Receive an assisted paging request from a first terminal device, then determine acceptance of the assisted paging request — 1201

Monitor the paging message paging the first terminal device at a first paging occasion corresponding to the first terminal device — 1202

Transmit a wake-up command to the first terminal device — 1203

FIG. 12

PAGING METHODS AND APPARATUSES, AND STORAGE MEDIA

CROSS-REFERENCE TO RELATED APPLICATIONS

This application is the U.S. national phase of PCT Application No. PCT/CN2021/077746 filed on Feb. 24, 2021, the disclosure of which is incorporated herein by reference in its entirety for all purposes.

TECHNICAL FIELD

The present disclosure relates to the field of communications, and in particular to a paging method and apparatus, and a storage medium.

BACKGROUND

At present, a DRX (Discontinue Reception) technology may be used to achieve power saving of a terminal device. The terminal device periodically enters a sleep state in a specific period of time, and does not monitor network paging messages, that is, does not monitor PDCCH (Physical Downlink Control Channel) sub-frames. The terminal device wakes up from the sleep state when monitoring is required. However, the use of the DRX technology may affect the data transmission delay, and the terminal device in the sleep state cannot receive the paging messages and respond in time. Moreover, even with the DRX technology, the terminal device is required to monitor the paging messages periodically, which still causes additional power consumption.

In addition, an MICO (Mobile Initiated Connectivity Only) technology may be used to achieve energy saving. The MICO technology may be set such that only the terminal device initiates a service for a specific device and a specific service, without monitoring the paging messages. When the terminal device is in an MICO state, the terminal device is unreachable and the network cannot page the terminal device. However, the use of the MICO technology may cause the terminal device cannot receive network-side initiated services.

SUMMARY

In order to overcome the problems in the related art, embodiments of the present disclosure provide a paging method and apparatus, and a storage medium.

According to a first aspect of the present disclosure, there is provided a paging method applied to a first terminal device, including:

determining that entry into a target sleep state is required, and transmitting an assisted paging request to at least one second terminal device; and determining that a target terminal device of the at least one second terminal device accepts the assisted paging request, and entering the target sleep state.

According to a second aspect of the present disclosure, there is provided a paging method applied to a second terminal device, including:

receiving an assisted paging request from a first terminal device, and determining acceptance of the assisted paging request; and monitoring a paging message paging the first terminal device.

According to a third aspect of the present disclosure, there is provided a paging apparatus, including: a processor and a memory configured to store instructions executable by the processor. Furthermore, the processor is configured to: determine that entry into a target sleep state is required, and transmit an assisted paging request to at least one second terminal device; and determine that a target terminal device of the at least one second terminal device accepts the assisted paging request, and enter the target sleep state.

According to a fourth aspect of the present disclosure, there is provided a paging apparatus, including: a processor and a memory configured to store instructions executable by the processor. Furthermore, the processor is configured to perform the paging method according to the second aspect above.

According to a fifth aspect of the present disclosure, there is provided a non-transitory computer-readable storage medium storing a plurality of programs for execution by a first terminal device having one or more processors, wherein the plurality of programs, when executed by the one or more processors, cause the first terminal device to perform the method according to the first aspect above.

According to a sixth aspect of the present disclosure, there is provided a non-transitory computer-readable storage medium storing a plurality of programs for execution by a second terminal device having one or more processors, wherein the plurality of programs, when executed by the one or more processors, cause the second terminal device to perform the method according to the second aspect above.

It is to be understood that the above general description and the following detailed description are exemplary and explanatory only and are not intended to limit the present disclosure.

BRIEF DESCRIPTION OF DRAWINGS

The accompanying drawings, which are incorporated into and constitute a part of this specification, illustrate embodiments consistent with the present disclosure and, together with the specification, serve to explain the principles of the present disclosure.

FIG. 1 is a schematic flowchart illustrating a paging method according to an embodiment.

FIG. 2 is a schematic flowchart illustrating a paging method according to another embodiment.

FIG. 3 is a schematic flowchart illustrating a paging method according to another embodiment.

FIG. 4 is a schematic flowchart illustrating a paging method according to another embodiment.

FIG. 5 is a schematic flowchart illustrating a paging method according to another embodiment.

FIG. 6 is a schematic flowchart illustrating a paging method according to another embodiment.

FIG. 7 is a schematic flowchart illustrating a paging method according to another embodiment.

FIG. 8 is a schematic flowchart illustrating a paging method according to another embodiment.

FIG. 9 is a schematic flowchart illustrating a paging method according to another embodiment.

FIG. 10 is a schematic flowchart illustrating a paging method according to another embodiment.

FIG. 11 is a schematic flowchart illustrating a paging method according to another embodiment.

FIG. 12 is a schematic flowchart illustrating a paging method according to another embodiment.

DETAILED DESCRIPTION

Figure 13:
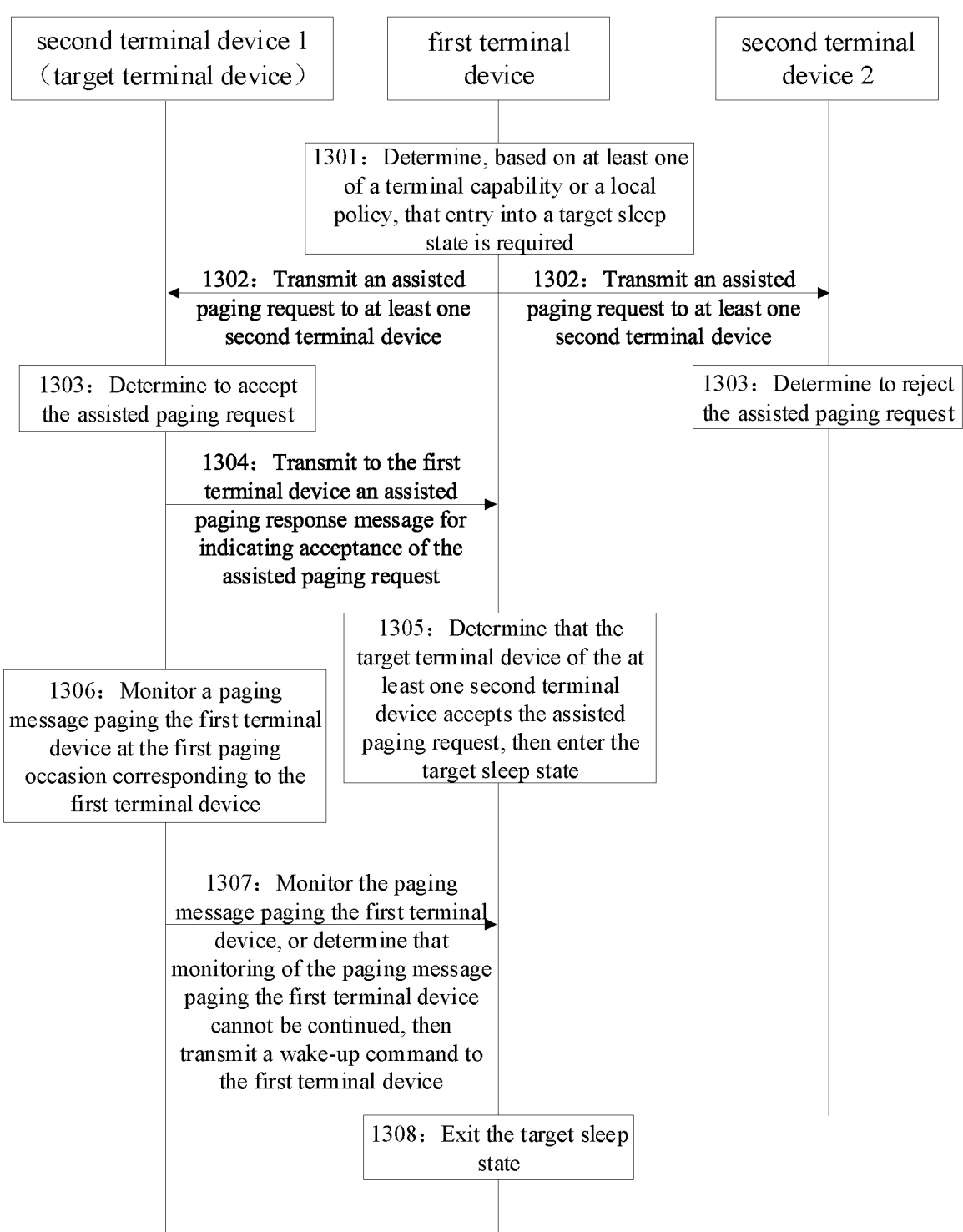
FIG. 13 is a schematic flowchart illustrating a paging method according to another embodiment.

Reference will now be made in detail to exemplary embodiments, examples of which are illustrated in the accompanying drawings. When the following description refers to the drawings, the same numerals in different drawings indicate the same or similar elements, unless otherwise indicated. Embodiments described in the following embodiments are not intended to be representative of all embodiments consistent with the present disclosure. Rather, they are merely examples of apparatuses and methods consistent with some aspects of the present disclosure as detailed in the appended claims.

The terminology used in the present disclosure is for the purpose of describing particular embodiments only, and is not intended to limit the present disclosure. As used in the present disclosure and the appended claims, singular forms of "a," "an," "said," and "the" are intended to include plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in the present disclosure to describe various information, such information should not be limited by these terms. These terms are used only to distinguish the same type of information from one another. For example, the first information may also be referred to as the second information, and similarly, the second information may also be referred to as the first information, without departing from the scope of the present disclosure. Depending on the context, the word "if" as used herein may be interpreted as "when," "upon" or "in response to determining."

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In the related art, an MICO technology may include the following three MICO modes.

The first mode is an MICO mode with extended connection time.

When a terminal device initiates a service actively, the connection state is extended such that downlink data can be delivered to the terminal device if the network caches or has a service downlinked to the terminal device. However, in this mode, the connection state needs to be extended when the downlink data is available on the network before the terminal device completely enters the MICO mode. Once the terminal device enters the MICO mode, the network cannot page the terminal device, and the terminal device cannot receive the downlink service.

The second mode is an MICO mode with support for an active time.

When the terminal device finishes initiating a service actively and is in an idle state, the terminal device can be paged by the network within a certain period of time, i.e., an active time value. A new timer needs to be negotiated for each registration update; if not available, the terminal device enters the MICO mode directly.

This mode is applicable when the terminal device enters the idle state after finishing the service, and the network can still page the terminal device within a certain period of time, during which time the terminal device still needs to consume power to monitor the paging message. After that, the terminal device enters the full MICO mode, the network cannot page the terminal device, and the terminal device cannot receive the downlink service.

The third mode is an MICO mode with the timer updated periodically.

When an expected behavior by the terminal device identifies that there is no downlink service, the network allocates a longer periodic registration update timer, and if there is a downlink service, the network allocates a registration time period for the terminal device to wake up and receive the downlink service.

In this mode, the terminal device is required to provide an expected behavior in each registration update period, for example, whether there is a downlink service coming in the next registration update period, if there is no downlink service, the terminal device completely enters the MICO mode, and if there is a downlink service, the terminal device renegotiates a periodic registration timer. Usually, the terminal device is unable to predict the downlink service and provide information about whether the downlink service is available on the network.

Thus it can be seen that in the MICO technology, the terminal device side cannot receive the service initiated by the network side, which may affect the normal operation of the terminal service. Even with the DRX technology, the terminal device is required to monitor the paging message periodically, resulting in additional power consumption.

In order to solve the above problems, the present disclosure provides a paging scheme, which ensures that the terminal device can receive the service initiated by the network side in time while achieving energy saving and power saving of the terminal device.

The paging scheme according to the present disclosure will be described below from the first terminal device side.

An embodiment of the present disclosure provides a paging method, which may be applied to a first terminal device. The first terminal device includes, but is not limited to, an IOT (Internet of Things) device. Referring to FIG. 1, which is a flowchart illustrating a paging method according to an embodiment, the method may include the following blocks 101 and 102.

At block 101, in response to determining that entry into a target sleep state is required, an assisted paging request is transmitted to at least one second terminal device.

In the embodiment of the present disclosure, the target sleep state is a state in which the first terminal device enters an idle state without monitoring a paging message, and a target terminal device monitors the paging message for the first terminal device. The at least one second terminal device is a terminal device located around the first terminal device, including, but not limited to, within a specified distance range.

At block 102, in response to determining that a target terminal device of the at least one second terminal device accepts the assisted paging request, the target sleep state is entered.

In the embodiment of the present disclosure, the target terminal device is a terminal device among the at least one second terminal device that accepts the assisted paging request.

In the above embodiment, a first terminal device may transmit an assisted paging request to at least one second terminal device, and the first terminal device may enter a target sleep state, where a target terminal device accepting the assisted paging request monitors a paging message paging the first terminal device for the first terminal device, such that the first terminal device can obtain a service delivered by a network side in time even after the first terminal device enters the sleep state. This ensures that the first terminal device can receive the service initiated by the network side in time, while achieving energy saving and power saving of the first terminal device.

In some alternative embodiments, referring to FIG. 2, which is a flowchart illustrating a paging method according to an embodiment, the method may include the following blocks 201 to 203.

At block 201, in response to determining that the first terminal device supports entry into the target sleep state and the first terminal device is in direct connection with the at least one second terminal device, it is determined that entry into the target sleep state is required.

In the embodiment of the present disclosure, the first terminal device may determine whether to support entry into the target sleep state based on at least one of its own terminal capability or a local configuration (or local policy).

In addition, the first terminal device needs to be directly connected with the at least one second terminal device. In an implementation, the first terminal device may establish a non-3GPP (3rd Generation Partnership Project) connection with the at least one second terminal device, where the non-3GPP connection includes, but is not limited to, Bluetooth connection, and ZigBee connection.

In another implementation, the first terminal device may establish a D2D (Device-to-Device) connection with the at least one second terminal device.

In the embodiment of the present disclosure, the first terminal device may determine that entry into the target sleep state is required when it is determined that the first terminal device supports entry into the target sleep state and the first terminal device is in direct connection with the at least one second terminal device. The target sleep state is a state in which the first terminal device enters an idle state without monitoring a paging message, and the target terminal device monitors the paging message for the first terminal device.

At block 202, an assisted paging request is transmitted to the at least one second terminal device.

At block 203, in response to determining that the target terminal device of the at least one second terminal device accepts the assisted paging request, the target sleep state is entered.

In the embodiment of the present disclosure, the target terminal device is a terminal device among the at least one second terminal device that accepts the assisted paging request.

In the above embodiment, a first terminal device may transmit an assisted paging request to at least one second terminal device around the first terminal device when it is determined that the first terminal device supports entry into a target sleep state and the first terminal device is in direct connection with the at least one second terminal device, such that a target terminal device monitors a paging message paging the first terminal device for the first terminal device, which ensures that the first terminal device can receive the service initiated by the network side in time, while achieving energy saving and power saving of the first terminal device.

In some alternative embodiments, referring to FIG. 3, which is a flowchart illustrating a paging method according to an embodiment, the method may include the following blocks 301 to 303.

At block 301, in response to determining that entry into a target sleep state is required, an assisted paging request is transmitted to at least one second terminal device.

In the embodiment of the present disclosure, the target sleep state is a state in which the first terminal device enters an idle state without monitoring a paging message, and a target terminal device monitors the paging message for the first terminal device. The at least one second terminal device is a terminal device located around the first terminal device, including, but not limited to, within a specified distance range.

At block 302, in response to determining that a target terminal device of the at least one second terminal device accepts the assisted paging request, the target sleep state is entered.

In the embodiment of the present disclosure, the target terminal device is a terminal device among the at least one second terminal device that accepts the assisted paging request.

At block 303, in response to receiving a wake-up command from the target terminal device, the target sleep state is exited.

In the embodiment of the present disclosure, in the case that the target terminal device monitors the paging message paging the first terminal device, or cannot continue to monitor the paging message paging the first terminal device, the target terminal device may transmit a wake-up command to the first terminal device, and the first terminal device exits the target sleep state based on the wake-up command.

In the above embodiment, the first terminal device may exit the target sleep state based on the wake-up command transmitted from the second terminal device, so as to avoid missing the service initiated by the network side and to achieve high availability.

In some alternative embodiments, referring to FIG. 4, which is a flowchart illustrating a paging method according to an embodiment, the method may include the following blocks 401 to 404.

At block 401, in response to determining that entry into a target sleep state is required, an assisted paging request is transmitted to at least one second terminal device.

In the embodiment of the present disclosure, the target sleep state is a state in which the first terminal device enters an idle state without monitoring a paging message, and a target terminal device monitors the paging message for the first terminal device. The at least one second terminal device is a terminal device located around the first terminal device, including, but not limited to, within a specified distance range.

At block 402, in response to determining that a target terminal device of the at least one second terminal device accepts the assisted paging request, the target sleep state is entered.

In the embodiment of the present disclosure, the target terminal device is a terminal device among the at least one second terminal device that accepts the assisted paging request.

At block 403, in response to receiving a wake-up command from the target terminal device, the target sleep state is exited.

In the embodiment of the present disclosure, in the case that the target terminal device monitors the paging message paging the first terminal device, or cannot continue to monitor the paging message paging the first terminal device, the target terminal device may transmit a wake-up command to the first terminal device, and the first terminal device exits the target sleep state based on the wake-up command.

At block 404, a connection state is entered, or a target monitoring mode is entered.

In the embodiment of the present disclosure, after exiting the target sleep state, the first terminal device may trigger a periodic registration process to enter the connection state, so as to receive the downlink service data transmitted from the network side.

Alternatively, after exiting the target sleep state, the first terminal device may enter the target monitoring mode when it is determined that there is no downlink service data, where the target monitoring mode is a monitoring mode in which the first terminal device monitors the paging message before entering the target sleep state.

In an implementation, the first terminal device monitors the paging message by using the DRX technology before entering the target sleep state, the target monitoring mode is the DRX mode accordingly, and the first terminal device continues to monitor the paging message by using the DRX technology after exiting the target sleep state.

In another implementation, the first terminal device monitors the paging message by using the MICO technology before entering the target sleep state, and the target monitoring mode is the MICO mode accordingly. After entering the MICO mode, the first terminal device does not monitor the paging message initiated by the network side.

In the above embodiment, in the case that the target terminal device monitors the paging message paging the first terminal device, or cannot continue to monitor the paging message for the first terminal device, the first terminal device may enter the connection state or the target monitoring mode after exiting the target sleep mode, which is easy to implement and has high availability.

In some alternative embodiments, in order for the target terminal device to monitor the paging message for the first terminal device, the target terminal device may monitor the paging message paging the first terminal device at a first paging occasion corresponding to the first terminal device, and the target terminal device may determine the first paging occasion based on the assisted paging request transmitted from the first terminal device.

In an implementation, the assisted paging request transmitted from the first terminal device may directly include paging occasion information for indicating the first paging occasion corresponding to the first terminal device.

In another implementation, the assisted paging request transmitted from the first terminal device may include associated information for determining the first paging occasion. Alternatively, the associated information includes, but is not limited to, a radio network temporary identity of the first terminal device, e.g., a GUTI (Globally Unique Temporary UE Identity). The target terminal device may subsequently calculate the first paging occasion corresponding to the first terminal device according to the associated information.

In the above embodiment, the first terminal device may allow the target terminal device to determine the first paging occasion corresponding to the first terminal device through the assisted paging request, which is easy to implement and has high availability.

In some alternative embodiments, in the case that the first paging occasion corresponding to the first terminal device has changed, the first terminal device may transmit an update notification message to the target terminal device. Alternatively, the update notification message may include paging occasion information for indicating a new updated first paging occasion corresponding to the first terminal device, or the update notification message may include associated information for determining the new updated first paging occasion corresponding to the first terminal device, including but not limited to a new updated radio network temporary identity of the first terminal device.

In the above embodiment, in the case that the first paging occasion corresponding to the first terminal device has changed, the target terminal device may be notified through the update notification message, such that the target terminal device monitors the paging message for the first terminal device at the new updated first paging occasion corresponding to the first terminal device, which ensures that the first terminal device can receive the service initiated by the network side in time, while achieving energy saving and power saving of the first terminal device.

In some alternative embodiments, referring to FIG. 5, which is a flowchart illustrating a paging method according to an embodiment, the method may include the following blocks 501 to 503.

At block 501, in response to determining that entry into a target sleep state is required, an assisted paging request is transmitted to at least one second terminal device.

In the embodiment of the present disclosure, the target sleep state is a state in which the first terminal device enters an idle state without monitoring a paging message, and a target terminal device monitors the paging message for the first terminal device. The at least one second terminal device is a terminal device located around the first terminal device, including, but not limited to, within a specified distance range.

At block 502, in response to receiving from a target terminal device of the at least one second terminal device an assisted paging response message for indicating acceptance of the assisted paging request, it is determined that the target terminal device accepts the assisted paging request.

At block 503, the target sleep state is entered.

In the above embodiment, a first terminal device may determine that a target terminal device of at least one second terminal device has accepted an assisted paging request after receiving from the target terminal device an assisted paging response message for indicating acceptance of the assisted paging request, and further, the first terminal device may enter a target sleep state in which the target terminal device monitors a paging message for the first terminal device. This ensures that the first terminal device can receive the service initiated by the network side in time, while achieving energy saving and power saving of the first terminal device.

The paging scheme according to the present disclosure will be described below from the second terminal device side.

An embodiment of the present disclosure provides a paging method, which may be applied to a second terminal device. The second terminal device may include, but is not limited to, an IOT device located around a first terminal device and in direct connection with the first terminal device. Referring to FIG. 6, which is a flowchart illustrating a paging method according to an embodiment, the method may include the following blocks 601 and 602.

At block 601, in response to receiving an assisted paging request from a first terminal device, it is determined to accept the assisted paging request.

At block 602, a paging message paging the first terminal device is monitored.

In the above embodiment, the second terminal device determines to accept the assisted paging request from the first terminal device, then the second terminal device may monitor the paging message for the first terminal device, which ensures that the first terminal device can receive the service initiated by the network side in time, while achieving energy saving and power saving of the first terminal device.

In some alternative embodiments, referring to FIG. 7, which is a flowchart illustrating a paging method according to an embodiment, the method may include the following blocks 701 and 702.

At block 701, the assisted paging request is received from the first terminal device, and it is determined to accept the assisted paging request in the case that the monitoring of the paging message for the first terminal device is supported and a first paging occasion corresponding to the first terminal device does not collide with a second paging occasion corresponding to the second terminal device.

In the embodiment of the present disclosure, the second terminal device may determine whether the monitoring of the paging message for the first terminal device is supported based on at least one of a terminal capability of the second terminal device or a local configuration (or local policy). The second terminal device may determine to accept the assisted paging request in the case that the monitoring of the paging message for the first terminal device is supported, and the first paging occasion corresponding to the first terminal device does not collide with the second paging occasion corresponding to the second terminal device.

At block 702, a paging message paging the first terminal device is monitored.

In the above embodiment, a second terminal device may determine to accept an assisted paging request in the case that monitoring of a paging message for a first terminal device is supported, and a first paging occasion corresponding to the first terminal device does not collide with a second paging occasion corresponding to the second terminal device, so as to monitor the paging message for the first terminal device. This ensures that the first terminal device can receive the service initiated by the network side in time, while achieving energy saving and power saving of the first terminal device.

In some alternative embodiments, the second terminal device may determine whether the monitoring of the paging message for the first terminal device is supported based on at least one of a terminal capability of the second terminal device or a local configuration (or local policy). The second terminal device may determine to reject the assisted paging request in the case that the monitoring of the paging message for the first terminal device is not supported, or the first paging occasion corresponding to the first terminal device collides with the second paging occasion corresponding to the second terminal device.

In some alternative embodiments, referring to FIG. 8, which is a flowchart illustrating a paging method according to an embodiment, the method may include the following blocks 801 to 803.

At block 801, an assisted paging request is received from the first terminal device, and a new second paging occasion corresponding to the second terminal device is determined in the case that a first paging occasion corresponding to the first terminal device collides with a second paging occasion corresponding to the second terminal device.

In the embodiment of the present disclosure, after the second terminal device receives the assisted paging request, if it is determined that the first paging occasion corresponding to the first terminal device collides with the second paging occasion corresponding to the second terminal device, the second terminal device may initiate a registration update request for requesting the network side to configure a new network temporary identity for the second terminal device. The network temporary identity includes, but is not limited to, a GUTI.

Further, the second terminal device may determine a new second paging occasion corresponding to the second terminal device based on the received new network temporary identity corresponding to the second terminal device.

At block 802, in response to determining that monitoring of a paging message for the first terminal device is supported, and that the first paging occasion does not collide with the new second paging occasion, it is determined to accept the assisted paging request.

In the embodiment of the present disclosure, the second terminal device determines that the monitoring of the paging message for the first terminal device is supported based on at least one of a terminal capability of the second terminal device or a local configuration (or local policy), and that the first paging occasion does not collide with the new second paging occasion updated by the second terminal device, the second terminal device may determine to accept the assisted paging request.

At block 803, a paging message paging the first terminal device is monitored.

In the above embodiment, when it is determined that there is a paging collision between the first terminal device and the second terminal device, the second terminal device may determine a new second paging occasion corresponding to the second terminal device through a registration update process, thereby solving the paging collision with the first paging occasion, so as to monitor the paging message for the first terminal device and to achieve high availability.

In some alternative embodiments, the second terminal device may determine a new second paging occasion upon determining that there is a paging collision with the first terminal device. Further, when the second terminal device determines that the monitoring of the paging message for the first terminal device is not supported based on at least one of a terminal capability of the second terminal device or a local configuration (or local policy), or the first paging occasion still collides with the new second paging occasion updated by the second terminal device, the second terminal device may determine to reject the assisted paging request.

In some alternative embodiments, referring to FIG. 9, which is a flowchart illustrating a paging method according to an embodiment, the method may include the following blocks 901 and 902.

At block 901, in response to receiving an assisted paging request from a first terminal device, it is determined to accept the assisted paging request.

At block 902, an assisted paging response message for indicating acceptance of the assisted paging request is transmitted to the first terminal device.

In the embodiment of the present disclosure, if the assisted paging response message transmitted from the second terminal device indicates that the assisted paging request is accepted, the second terminal device may monitor the paging message that pages the first terminal device. Alternatively, the second terminal device is not required to transmit an assisted paging response message to the first terminal device in the case of rejecting the assisted paging request, or the second terminal device transmits an assisted paging response message to the first terminal device for indicating that the assisted paging request is rejected in the case of rejecting the assisted paging request, which is not limited in the present disclosure.

In the above embodiment, the second terminal device may notify the first terminal device of the acceptance of the assisted paging request through the assisted paging response message, such that the first terminal device can enter the target sleep state, which is easy to implement and has high availability.

In some alternative embodiments, referring to FIG. 10, which is a flowchart illustrating a paging method according to an embodiment, the method may include the following blocks 1001 and 1002.

At block 1001, in response to receiving an assisted paging request from a first terminal device, it is determined to accept the assisted paging request.

In the embodiment of the present disclosure, the assisted paging request includes at least one of: paging occasion information for indicating a first paging occasion corresponding to the first terminal device; or associated information for determining the first paging occasion. The associated information includes, but is not limited to, a radio network temporary identity of the first terminal device, e.g., a GUTI corresponding to the first terminal device.

At block 1002, a paging message paging the first terminal device is monitored at a first paging occasion corresponding to the first terminal device.

In the embodiment of the present disclosure, if the second terminal device determines to accept the assisted paging request, the second terminal device may determine the first paging occasion directly according to the paging occasion information in the assisted paging request, or the second terminal device may calculate the first paging occasion according to the associated information in the assisted paging request. In this way, the paging message paging the first terminal device can be monitored at the first paging occasion corresponding to the first terminal device.

In the above embodiment, the second terminal device may monitor the paging message paging the first terminal device at the first paging occasion corresponding to the first terminal device, so as to avoid missing the service initiated by the network side for the first terminal device, which ensures that the first terminal device can receive the service initiated by the network side in time, while achieving energy saving and power saving of the first terminal device.

In some alternative embodiments, referring to FIG. 11, which is a flowchart illustrating a paging method according to an embodiment, the method may include the following blocks 1101 to 1104.

At block 1101, in response to receiving an assisted paging request from a first terminal device, it is determined to accept the assisted paging request.

In the embodiment of the present disclosure, the assisted paging request includes at least one of: paging occasion information for indicating a first paging occasion corresponding to the first terminal device; or associated information for determining the first paging occasion. The associated information includes, but is not limited to, a radio network temporary identity of the first terminal device, e.g., a GUTI corresponding to the first terminal device.

At block 1102, a paging message paging the first terminal device is monitored at a first paging occasion corresponding to the first terminal device.

At block 1103, a new first paging occasion corresponding to the first terminal device is determined based on an update notification message received from the first terminal device.

In the embodiment of the present disclosure, the update notification message may include paging occasion information for indicating the new updated first paging occasion corresponding to the first terminal device, or the update notification message may include associated information for determining the new updated first paging occasion corresponding to the first terminal device, including but not limited to a new updated radio network temporary identity of the first terminal device.

At block 1104, the paging message paging the first terminal device is monitored at the new first paging occasion corresponding to the first terminal device.

In the embodiment of the present disclosure, the second terminal device may monitor the paging message paging the first terminal device at the new first paging occasion corresponding to the first terminal device, in the case that the first paging occasion corresponding to the first terminal device has changed.

In the above embodiment, even if the first paging occasion corresponding to the first terminal device has changed, the second terminal device may monitor the paging message for the first terminal device in time based on the new first paging occasion corresponding to the first terminal device, so as to avoid missing the service initiated by the network side for the first terminal device, and to achieve high availability.

In some alternative embodiments, referring to FIG. 12, which is a flowchart illustrating a paging method according to an embodiment, the method may include the following blocks 1201 to 1203.

At block 1201, in response to receiving an assisted paging request from a first terminal device, it is determined to accept the assisted paging request.

In the embodiment of the present disclosure, the assisted paging request includes at least one of: paging occasion information for indicating a first paging occasion corresponding to the first terminal device; or associated information for determining the first paging occasion. The associated information includes, but is not limited to, a radio network temporary identity of the first terminal device, e.g., a GUTI corresponding to the first terminal device.

At block 1202, a paging message paging the first terminal device is monitored at a first paging occasion corresponding to the first terminal device.

At block 1203, a wake-up command is transmitted to the first terminal device.

In an implementation, the second terminal device may transmit the wake-up command to the first terminal device in the case of monitoring the paging message paging the first terminal device, such that the first terminal device exits the target sleep state based on the wake-up command, and then enters a connection state to receive downlink service data.

In another implementation, the second terminal device may transmit the wake-up command to the first terminal device when it is determined that the monitoring of the paging message paging the first terminal device cannot be continued. The first terminal device may exit the target sleep state based on the wake-up command, and enter a target monitoring mode when it is determined that there is no downlink service data transmitted from the network side, where the target monitoring mode is a monitoring mode in which the first terminal device monitors the paging message before entering the target sleep state.

In the above embodiment, the second terminal device may instruct the first terminal device to exit the target sleep state through the wake-up command in the case that the second terminal device monitors the paging message paging the first terminal device or cannot continue to monitor the paging message paging the first terminal device, so as to ensure the normal operation of the terminal service and to achieve high availability.

In some alternative embodiments, the second terminal device may determine, based on a local configuration (or local policy), that it cannot continue to monitor the paging message paging the first terminal device. For example, the local configuration instructs the second terminal device not to continue to monitor the paging message for the first terminal device after the second terminal device monitors the paging message for the first terminal device for a preset duration.

Alternatively, the second terminal device may determine that it cannot continue to monitor the paging message for the first terminal device when it determines that its power is insufficient, that is, the power is lower than or equal to a preset power value.

In the above embodiment, the second terminal device may transmit the wake-up command to the first terminal device based on at least one of a local configuration or insufficient power, such that the first terminal device exits the target sleep state, ensuring the service of the first terminal device and high availability.

In some alternative embodiments, referring to FIG. 13, which is a flowchart illustrating a paging method according to an embodiment, in the embodiment of the present disclosure, the second terminal device includes a second terminal device 1 and a second terminal device 2, a direct connection has been established between the first terminal device and the second terminal device, and the first terminal device and the second terminal device have been respectively registered on the network. The method may include the following blocks 1301 to 1308.

At block 1301, the first terminal device determines, based on at least one of a terminal capability or a local policy, that entry into a target sleep state is required.

The target sleep state is a state in which the first terminal device enters an idle state without monitoring a paging message, and a target terminal device monitors the paging message for the first terminal device.

At block 1302, the first terminal device transmits an assisted paging request to at least one second terminal device.

At block 1303, the second terminal device determines to accept the assisted paging request or reject the assisted paging request.

In the embodiment of the present disclosure, the second terminal device determines whether monitoring of the paging message for the first terminal device is supported based on at least one of a terminal capability or a local policy, and determines whether a first paging occasion corresponding to the first terminal device collides with a second paging occasion corresponding to the second terminal device. When it is determined that the monitoring of the paging message for the first terminal device is supported, and that the first paging occasion corresponding to the first terminal device does not collide with the second paging occasion corresponding to the second terminal device, it is determined that the assisted paging request is accepted; otherwise, it is determined that the assisted paging request is not accepted.

At block 1304, a target terminal device of the at least one second terminal device transmits to the first terminal device an assisted paging response message for indicating acceptance of the assisted paging request.

Alternatively, other second terminal devices may transmit to the first terminal device an assisted paging response message for indicating rejection of the assisted paging request (not shown in FIG. 13). Alternatively, other second terminal devices may not transmit an assisted paging response message to the first terminal device.

At block 1305, the first terminal device determines that the target terminal device of the at least one second terminal device accepts the assisted paging request and enters the target sleep state.

At block 1306, the target terminal device monitors a paging message paging the first terminal device at the first paging occasion corresponding to the first terminal device.

At block 1307, the target terminal device monitors the paging message paging the first terminal device, or determines that monitoring of the paging message paging the first terminal device cannot be continued, then the target terminal device transmits a wake-up command to the first terminal device.

At block 1308, the first terminal device exits the target sleep state.

Further, the first terminal device may enter a connection state or a target monitoring mode.

In the above embodiment, if the first paging occasion corresponding to the first terminal device has changed, the first terminal device may transmit an update notification message to the target terminal device, and the target terminal device monitors the paging message for the first terminal device at a new first paging occasion corresponding to the first terminal device (not shown in FIG. 13).

In the above embodiment, it is ensured that the first terminal device can receive the service initiated by the network side in time, while achieving energy saving and power saving of the first terminal device.

Figure 14:
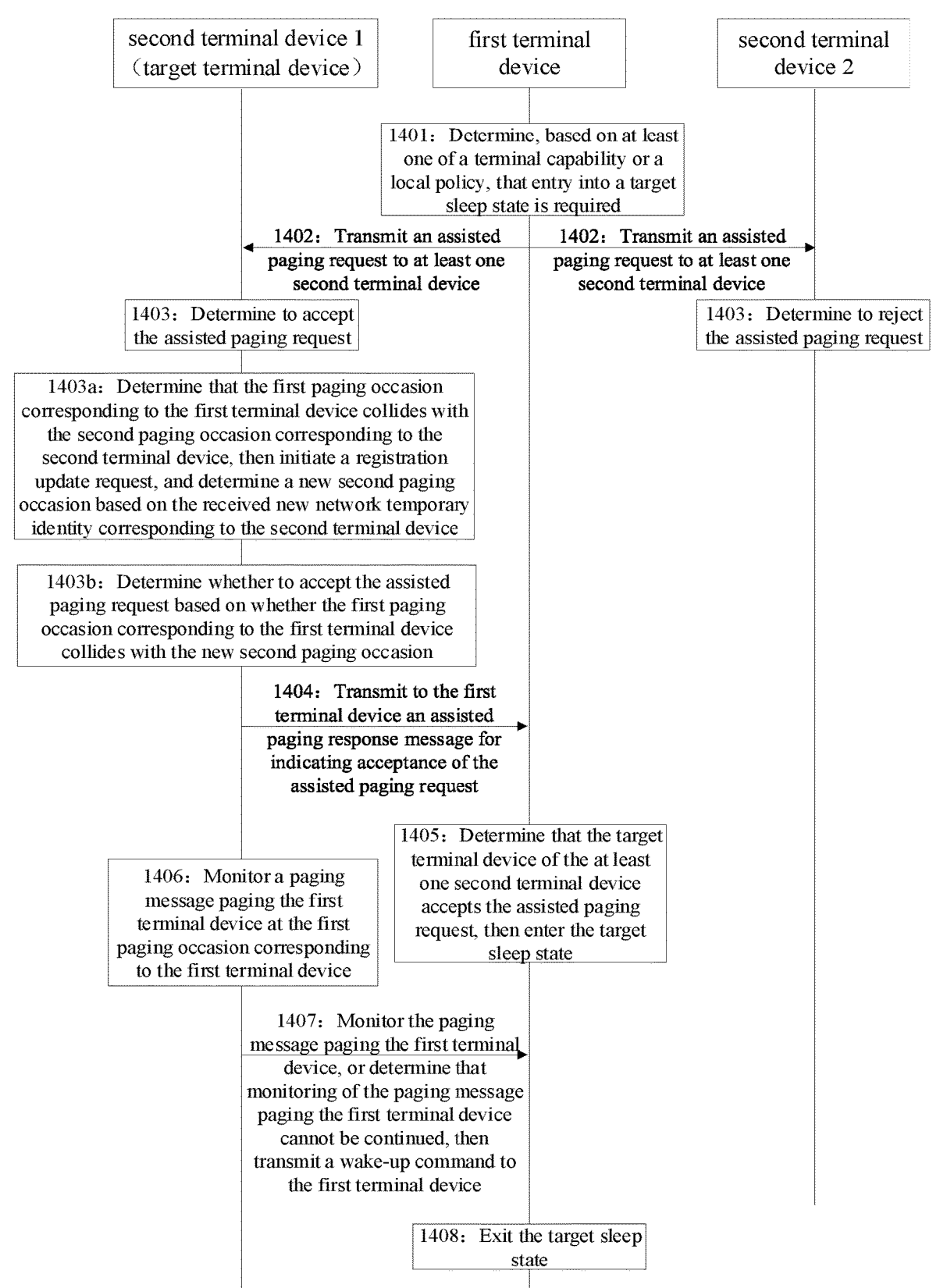
FIG. 14 is a schematic flowchart illustrating a paging method according to another embodiment.

In some alternative embodiments, referring to FIG. 14, which is a flowchart illustrating a paging method according to an embodiment, in the embodiment of the present disclosure, the second terminal device includes a second terminal device 1 and a second terminal device 2, a direct connection has been established between the first terminal device and the second terminal device, and the first terminal device and the second terminal device have been respectively registered on the network. The method may include the following blocks 1401 to 1408.

At block 1401, the first terminal device determines, based on at least one of a terminal capability or a local policy, that entry into a target sleep state is required.

The target sleep state is a state in which the first terminal device enters an idle state without monitoring a paging message, and a target terminal device monitors the paging message for the first terminal device.

At block 1402, the first terminal device transmits an assisted paging request to at least one second terminal device.

At block 1403, the second terminal device determines to accept the assisted paging request or reject the assisted paging request.

In the embodiment of the present disclosure, the second terminal device determines whether monitoring of the paging message for the first terminal device is supported based on at least one of a terminal capability or a local policy, and determines whether a first paging occasion corresponding to the first terminal device collides with a second paging occasion corresponding to the second terminal device. When it is determined that the monitoring of the paging message for the first terminal device is supported, and that the first paging occasion corresponding to the first terminal device does not collide with the second paging occasion corresponding to the second terminal device, it is determined that the assisted paging request is accepted; otherwise, it is determined that the assisted paging request is not accepted.

At block 1403a, the second terminal device determines that the first paging occasion corresponding to the first terminal device collides with the second paging occasion corresponding to the second terminal device, initiates a registration update request, and determines a new second paging occasion based on the received new network temporary identity corresponding to the second terminal device.

At block 1403b, it is determined whether to accept the assisted paging request based on whether the first paging occasion corresponding to the first terminal device collides with the new second paging occasion.

At block 1404, a target terminal device transmits to the first terminal device an assisted paging response message for indicating acceptance of the assisted paging request.

Alternatively, other second terminal devices may transmit to the first terminal device an assisted paging response message for indicating rejection of the assisted paging request (not shown in FIG. 14). Alternatively, other second terminal devices may not transmit an assisted paging response message to the first terminal device.

At block 1405, the first terminal device determines that the target terminal device of the at least one second terminal device accepts the assisted paging request and enters the target sleep state.

At block 1406, the target terminal device monitors a paging message paging the first terminal device at the first paging occasion corresponding to the first terminal device.

At block 1407, the target terminal device monitors the paging message paging the first terminal device, or determines that monitoring of the paging message paging the first terminal device cannot be continued, then the target terminal device transmits a wake-up command to the first terminal device.

At block 1408, the first terminal device exits the target sleep state.

Further, the first terminal device may enter a connection state or a target monitoring mode.

In the above embodiment, if the first paging occasion corresponding to the first terminal device has changed, the first terminal device may transmit an update notification message to the target terminal device, and the target terminal device monitors the paging message for the first terminal device at a new first paging occasion corresponding to the first terminal device (not shown in FIG. 14).

In the above embodiment, in the case that there is a paging collision between the second terminal device and the first terminal device, the second terminal device may determine a new second paging occasion, so as to determine whether the new second paging occasion corresponding to the second terminal device collides with the first paging occasion corresponding to the first terminal device, and thus to determine whether to accept the assisted paging request initiated by the first terminal device. It is also ensured that the first terminal device can receive the service initiated by the network side in time, while achieving energy saving and power saving of the first terminal device.

Corresponding to the foregoing embodiments of application function implementation methods, the present disclosure further provides embodiments of application function implementation apparatuses.

Figure 15:
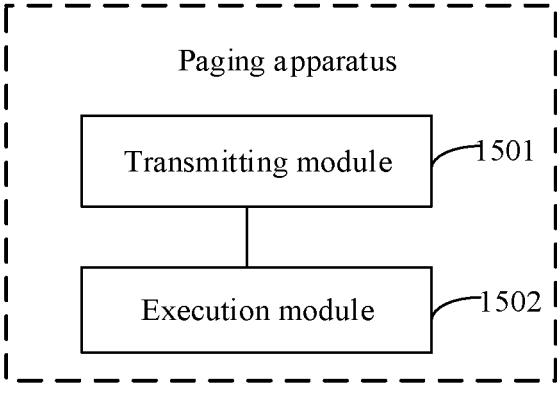
FIG. 15 is a block diagram illustrating a paging apparatus according to an embodiment.

Referring to FIG. 15, which is a block diagram illustrating a paging apparatus according to an embodiment, the apparatus is applied to a first terminal device and includes:

a transmitting module 1501 configured to, in response to determining that entry into a target sleep state is required, transmit an assisted paging request to at least one second terminal device; and an execution module 1502 configured to, in response to determining that a target terminal device of the at least one second terminal device accepts the assisted paging request, enter the target sleep state.

Figure 16:
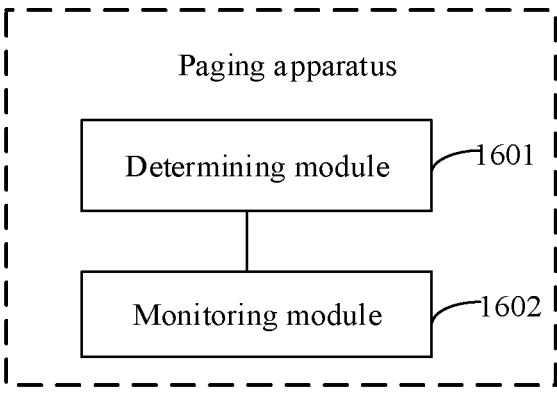
FIG. 16 is a block diagram illustrating a paging apparatus according to another embodiment.

Referring to FIG. 16, which is a block diagram illustrating a paging apparatus according to an embodiment, the apparatus is applied to a second terminal device and includes:

a determining module 1601 configured to, in response to receiving an assisted paging request from a first terminal device, determine acceptance of the assisted paging request; and a monitoring module 1602 configured to monitor a paging message paging the first terminal device.

For the apparatus embodiments, since they basically correspond to the method embodiments, reference may be made to part of the description of the method embodiments for the relevant portions. The apparatus embodiments as described above are merely illustrative, where units described above as separated components may or may not be physically separated, and components shown as units may or may not be physical units, i.e., may be located in one place, or may be distributed over a plurality of network units. Some or all of the modules may be selected according to actual needs to achieve the purpose of the disclosed solution. Those ordinary skilled in the art can understand and implement it without any creative efforts.

Correspondingly, the present disclosure further provides a paging apparatus, including:

a processor; and a memory configured to store instructions executable by the processor, where the processor is configured to perform the paging method described above for either the first terminal device side or the second terminal device side.

Figure 17:
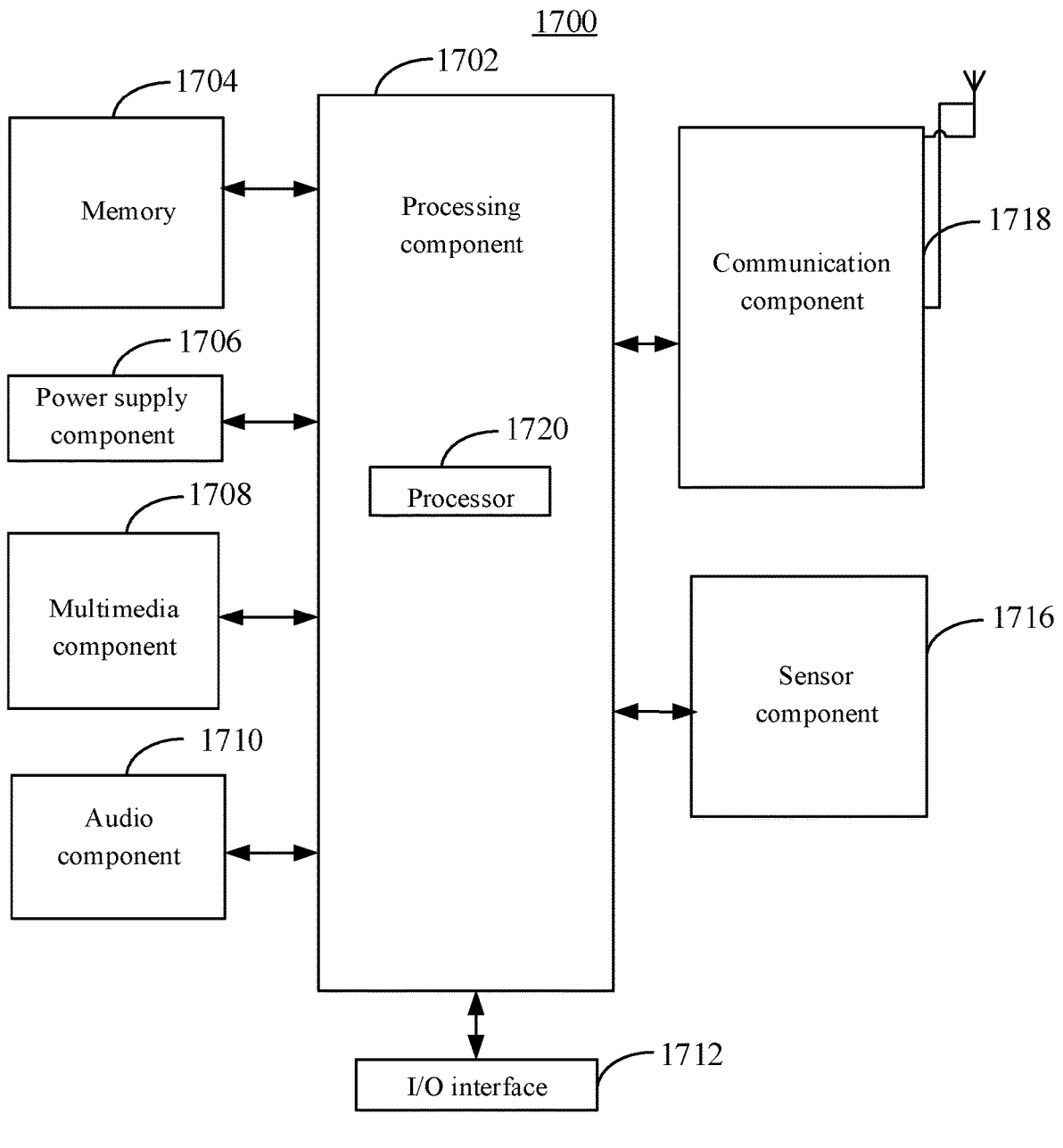
FIG. 17 is a schematic structural diagram illustrating a paging apparatus according to an embodiment of the present disclosure.

FIG. 17 is a block diagram illustrating an electronic device 1700 according to an example embodiment. For example, the electronic device 1700 may be a terminal device such as a mobile phone, a tablet computer, an e-book reader, a multimedia player, a wearable device, a vehicle-mounted user device, an iPad, or a smart TV, and the terminal device may be a first terminal device or a second terminal device.

Referring to FIG. 17, the electronic device 1700 may include one or more of a processing component 1702, a memory 1704, a power supply component 1706, a multimedia component 1708, an audio component 1710, an input/output (I/O) interface 1712, a sensor component 1716, and a communication component 1718.

The processing component 1702 generally controls overall operations of the electronic device 1700, such as operations associated with display, a telephone call, data paging, a camera operation, and a record operation. The processing component 1702 may include one or more processors 1720 for executing instructions to complete all or a part of blocks in the above paging methods. Further, the processing component 1702 may include one or more modules to facilitate interaction between the processing component 1702 and another component. As an example, the processing component 1702 may include a multimedia module to facilitate interaction between the multimedia component 1708 and the processing component 1702. As another example, the processing component 1702 may read executable instructions from the memory to implement blocks in the paging methods according to the above embodiments.

The memory 1704 is configured to store various types of data to support operations at the electronic device 1700. Examples of such data include instructions for any application or method operated on the electronic device 1700, contact data, phonebook data, messages, pictures, videos, and so on. The memory 1704 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or a compact disk.

The power supply component 1706 supplies power to various components of the electronic device 1700. The power supply component 1706 may include a power supply management system, one or more power supplies, and other components associated with generating, managing and distributing power for the electronic device 1700.

The multimedia component 1708 includes a display screen for providing an output interface between the electronic device 1700 and a user. In some examples, the multimedia component 1708 may include a front camera and/or a rear camera. When the electronic device 1700 is in an operation mode, such as a shooting mode or a video mode, the front camera and/or the rear camera may receive external multimedia data. Each of the front camera and the rear camera may be a fixed optical lens system or have a focal length and an optical zoom capability.

The audio component 1710 is configured to output and/or input an audio signal. For example, the audio component 1710 includes a microphone (MIC). When the electronic device 1700 is in an operation mode, such as a call mode, a record mode and a voice recognition mode, the microphone is configured to receive an external audio signal. The received audio signal may be further stored in the memory 1704 or transmitted via the communication component 1718. In some examples, the audio component 1710 further includes a speaker for outputting an audio signal.

The I/O interface 1712 provides an interface between the processing component 1702 and a peripheral interface module. The peripheral interface module may be a keyboard, a click wheel, a button, or the like. The button may include but is not limited to, a home button, a volume button, a start button, and a lock button.

The sensor component 1716 includes one or more sensors for providing a state assessment in various aspects for the electronic device 1700. For example, the sensor component 1716 may detect an on/off state of the electronic device 1700, and a relative location between components, which are, for example, a display and a keypad of the electronic device 1700. The sensor component 1716 may also detect a position change of the electronic device 1700 or a component of the electronic device 1700, presence or absence of a touch of a user on the electronic device 1700, an orientation or acceleration/deceleration of the electronic device 1700, and a temperature change of the electronic device 1700. The sensor component 1716 may include a proximity sensor configured to detect the presence of a nearby object without any physical contact. The sensor component 1716 may further include an optical sensor, such as a CMOS or CCD image sensor used in an imaging application. In some examples, the sensor component 1716 may further include an acceleration sensor, a gyro sensor, a magnetic sensor, a pressure sensor, or a temperature sensor.

The communication component 1718 is configured to facilitate wired or wireless communication between the electronic device 1700 and other devices. The electronic device 1700 may access a wireless network based on a communication standard, such as Wi-Fi, 2G, 3G, 4G, 5G, 6G, or a combination thereof. In an example, the communication component 1718 receives a broadcast signal or broadcast-related information from an external broadcast management system via a broadcast channel. In an example, the communication component 1718 may further include a Near Field Communication (NFC) module for promoting short-range communication. For example, the NFC module may be implemented based on radio frequency identification (RFID) technology, infrared data association (IrDA) technology, ultra-wideband (UWB) technology, Bluetooth (BT) technology and other technologies.

In an example, the electronic device 1700 may be implemented by one or more of application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for executing the paging method described above for either terminal device side.

In an example, there is further provided a non-transitory computer-readable storage medium including instructions, such as the memory 1704 including instructions. The above instructions may be executed by the processor 1720 of the electronic device 1700 to complete the above paging methods. For example, the non-transitory computer-readable storage medium may be an ROM, a Random Access Memory (RAM), a CD-ROM, a magnetic tape, a floppy disk, and an optical data storage device, etc.

Technical solutions provided in the embodiments of the present disclosure may include the following beneficial effects.

In the embodiments of the present disclosure, a first terminal device may transmit an assisted paging request to at least one second terminal device, and the first terminal device may enter a target sleep state, where a target terminal device accepting the assisted paging request monitors a paging message paging the first terminal device for the first terminal device, such that the first terminal device can obtain a service delivered by a network side in time even after the first terminal device enters the sleep state. This ensures that the first terminal device can receive the service initiated by the network side in time, while achieving energy saving and power saving of the first terminal device.

Other embodiments of the present disclosure will readily occur to those skilled in the art upon consideration of the specification and practice of the invention disclosed herein. The present disclosure is intended to cover any variations, uses, or adaptations of the present disclosure that follow the general principles of the present disclosure and include common general knowledge or conventional technical means in the art not disclosed herein. The specification and embodiments are to be considered exemplary only, with a true scope and spirit of the present disclosure being indicated by the following claims.

It should be understood that the present disclosure is not limited to the precise structures which have been described above and shown in the accompanying drawings, and that various modifications and changes may be made without departing from the scope thereof. The scope of the present disclosure is limited only by the appended claims.

What is claimed is:

1. A paging method, comprising:
determining, by a first terminal device, that entry into a target sleep state is required, and transmitting, by the first terminal device, an assisted paging request to at least one second terminal device; and
determining, by the first terminal device, that a target terminal device of the at least one second terminal device accepts the assisted paging request, and entering, by the first terminal device, the target sleep state,
wherein the assisted paging request comprises at least one of following information:
paging occasion information for indicating a first paging occasion corresponding to the first terminal device; or
associated information for determining the first paging occasion.

2. The paging method according to claim 1, wherein determining that entry into the target sleep state is required, comprises:
determining that the first terminal device supports entry into the target sleep state and the first terminal device is in direct connection with the at least one second terminal device, and determining that entry into the target sleep state is required.

3. The paging method according to claim 1, further comprising:
after entering the target sleep state,
receiving a wake-up command from the target terminal device, and exiting the target sleep state.

4. The paging method according to claim 3, further comprising:
after exiting the target sleep state,
entering a connection state; or
entering a target monitoring mode, wherein the target monitoring mode is a monitoring mode in which the first terminal device monitors a paging message before entering the target sleep state.

5. The paging method according to claim 1, wherein the target sleep state is a state in which the first terminal device enters an idle state without monitoring a paging message and the target terminal device monitors the paging message for the first terminal device.

6. The paging method according to claim 1, further comprising:
determining that the first paging occasion has changed, and transmitting an update notification message to the target terminal device.

7. The paging method according to claim 1, wherein determining that the target terminal device of the at least one second terminal device accepts the assisted paging request, comprises:

receiving an assisted paging response message from the target terminal device for indicating acceptance of the assisted paging request, and determining that the target terminal device accepts the assisted paging request.

8. A paging method, comprising:
receiving, by a second terminal device, an assisted paging request from a first terminal device, and determining, by the second terminal device, acceptance of the assisted paging request; and
monitoring, by the second terminal device, a paging message paging the first terminal device,
wherein the assisted paging request comprises at least one of following information:
paging occasion information for indicating a first paging occasion corresponding to the first terminal device; or
associated information for determining the first paging occasion.

9. The paging method according to claim 8, wherein determining acceptance of the assisted paging request, comprises:
determining that monitoring of the paging message for the first terminal device is supported, and that a first paging occasion corresponding to the first terminal device does not collide with a second paging occasion corresponding to the second terminal device, and determining acceptance of the assisted paging request.

10. The paging method according to claim 9, further comprising:
determining that the monitoring of the paging message for the first terminal device is not supported, or that the first paging occasion corresponding to the first terminal device collides with the second paging occasion corresponding to the second terminal device, and determining rejection of the assisted paging request.

11. The paging method according to claim 8, further comprising:
determining that a first paging occasion corresponding to the first terminal device collides with a second paging occasion corresponding to the second terminal device, and determining a new second paging occasion corresponding to the second terminal device,
wherein determining acceptance of the assisted paging request, comprises:
in response to determining that monitoring of the paging message for the first terminal device is supported, and that the first paging occasion does not collide with the new second paging occasion, determining acceptance of the assisted paging request.

12. The paging method according to claim 11, wherein determining the new second paging occasion corresponding to the second terminal device, comprises:
initiating a registration update request for requesting a network side to configure a new network temporary identity for the second terminal device; and
determining the new second paging occasion based on the new network temporary identity for the second terminal device.

13. The paging method according to claim 8, further comprising:
transmitting an assisted paging response message to the first terminal device for indicating acceptance of the assisted paging request.

14. The paging method according to claim 8, wherein monitoring the paging message paging the first terminal device, comprises:

monitoring the paging message paging the first terminal device at a first paging occasion corresponding to the first terminal device.

15. The paging method according to claim 8, further comprising:

determining a new first paging occasion corresponding to the first terminal device based on an update notification message received from the first terminal device; and monitoring the paging message paging the first terminal device at the new first paging occasion corresponding to the first terminal device.

16. The paging method according to claim 8, further comprising:

transmitting a wake-up command to the first terminal device, wherein transmitting the wake-up command to the first terminal device, comprises:

monitoring the paging message paging the first terminal device, and transmitting the wake-up command to the first terminal device; or determining that monitoring of the paging message paging the first terminal device cannot be continued, and transmitting the wake-up command to the first terminal device, wherein determining that the monitoring of the paging message paging the first terminal device cannot be continued, comprises:

determining, based on a local configuration, that the monitoring of the paging message paging the first terminal device cannot be continued; or determining, in response to determining that power is lower than or equal to a preset power value, that the monitoring of the paging message paging the first terminal device cannot be continued.

17. A paging apparatus, comprising:

a processor; and a memory configured to store instructions executable by the processor, wherein the processor is configured to perform the paging method according to claim 9.

18. A paging apparatus, comprising:

a processor; and a memory configured to store instructions executable by the processor, wherein the processor is configured to:

determine that entry into a target sleep state is required, and transmit an assisted paging request to at least one second terminal device; and determine that a target terminal device of the at least one second terminal device accepts the assisted paging request, and enter the target sleep state, wherein the assisted paging request comprises at least one of following information:

paging occasion information for indicating a first paging occasion corresponding to the first terminal device; or associated information for determining the first paging occasion.

* * * * *